United States Patent [19]

Saito et al.

[11] Patent Number: 5,121,533
[45] Date of Patent: Jun. 16, 1992

[54] FITTING METHOD UTILIZING BOTH CONTINUOUS AND INTERMITTENT ULTRASONIC VIBRATION

[75] Inventors: Nagao Saito; Naotake Mohri, both of Aichi, Japan

[73] Assignee: Mitsubishi Denki K.K., Tokyo, Japan

[21] Appl. No.: 702,119

[22] Filed: May 16, 1991

Related U.S. Application Data

[63] Continuation of Ser. No. 596,615, Oct. 12, 1990, abandoned, which is a continuation of Ser. No. 483,291, Feb. 20, 1990, abandoned, which is a continuation of Ser. No. 323,928, Mar. 15, 1990, abandoned.

[30] Foreign Application Priority Data

Mar. 15, 1988 [JP] Japan .................................. 63-60759

[51] Int. Cl.⁵ ...................... B23Q 17/00; B23P 19/02
[52] U.S. Cl. ........................................ 29/407; 29/525; 29/DIG. 46
[58] Field of Search .............. 29/525, 238, 426.6, 29/432, 709, DIG. 46, 407; 175/55, 56, 57

[56] References Cited

U.S. PATENT DOCUMENTS

3,224,086  12/1965  Balamuth ................. 29/DIG. 46 X

FOREIGN PATENT DOCUMENTS

457577  2/1975  U.S.S.R. ................................. 29/709

Primary Examiner—P. W. Echols
Assistant Examiner—David P. Bryant
Attorney, Agent, or Firm—Sughrue, Mion, Zinn, Macpeak & Seas

[57] ABSTRACT

A fitting of a first member into a second member is performed until an insertion depth becomes a predetermined value while applying ultrasonic vibration continuously to either or both of the members and, thereafter, the application of ultrasonic vibration is made intermittent.

3 Claims, 8 Drawing Sheets

FITTING METHOD UTILIZING BOTH CONTINUOUS AND INTERMITTENT ULTRASONIC VIBRATION

This is a continuation of abandoned U.S. Pat. No. 07/596,615 filed Oct. 12, 1990; which is a continuation of abandoned U.S. Pat. No. 07/483,291 filed Feb. 20, 1990; which is a continuation of abandoned U.S. Pat. No. 07/323,928 filed Mar. 15, 1989.

BACKGROUND OF THE INVENTION

The present invention relates to a fitting of a member in another, with clearance of several microns or less or even negative clearance, and, particularly, to a method of fitting of two members without gouging and with reduced insertion force.

Figure 5:
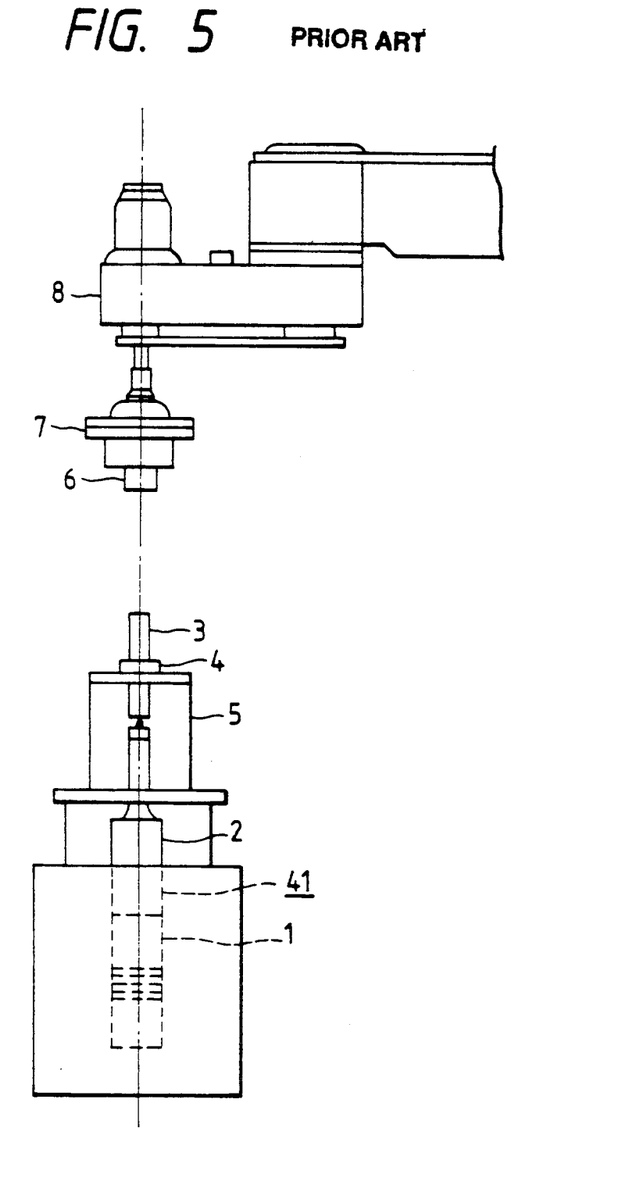
FIG. 5 shows a construction of a fitting apparatus using ultrasonic vibration.

As an example of known fitting methods, Japanese Patent Application Laid-Open No. 224711/1987 discloses a fitting apparatus such as shown in FIG. 5 of this application. In FIG. 5, a ultrasonic vibration apparatus 41 is constituted with a vibrator 1 and a stepped hone 2 connected to the vibrator 1.

A pin 3 to be inserted into a hole of a part 6 is held in contact with an end of the hone 2 and supported substantially coaxially with the hone 2 by a circular ring 4 provided on a sample holder 5. The ring 4 may be movable horizontally within a limited distance of several millimeters.

The part 6 is supported by a hand portion 7 mounted on an arm 8 of a multi-articulation robot having freedom in a horizontal plane and an altitude and position of the part 6 are controlled by the robot in such a way that the hole of the part 6 is substantially coaxial with the pin 3.

In operation, a fitting of the pin 3 in the hole of the part 6 starts by lowering the part 6 on the robot arm 8. When the pin 3 commences to enter into the hole of the part 6, frictional force is generated therebetween and the pin 3 is urged, by resultant contact reaction, to a top end of the hone 2 on the ultrasonic vibration apparatus 41, by which ultrasonic vibration is transmitted to the pin 3 which just starts to enter into the hole. In this case, the pin 3 is vibrated at a composite frequency of a resonance frequency of the ultrasonic vibrator and a specific frequency of the pin 3. Since amplitude of vibration of the pin 3 is maximum at the top end thereof, frictional force in the contact plane thereof with the part 6 is substantially reduced.

On the other hand, there is a radial vibration in the pin 3 by which the latter expands and contracts radially alternatively. Therefore, in partially fitted state, clearance between the pin and the hole is increased temporarily repeatedly, facilitating the fitting with small insertion force. A model of this operation is illustrated schematically in FIGS. 6a to 6c.

Figure 6A:
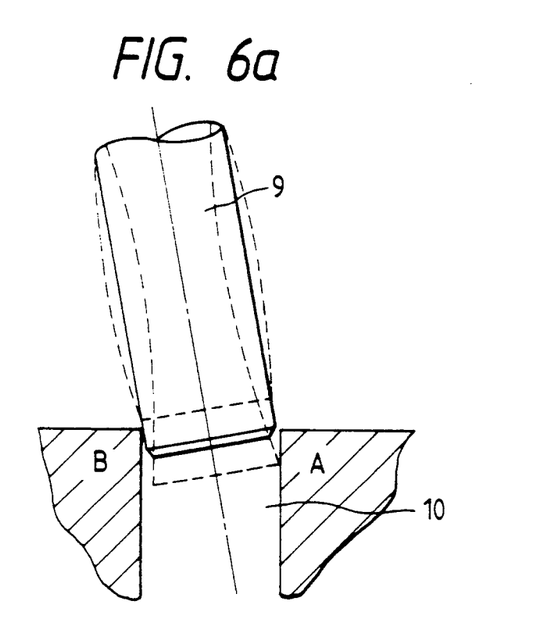
FIG. 6 is a conceptional model showing an operation.
Figure 6B:
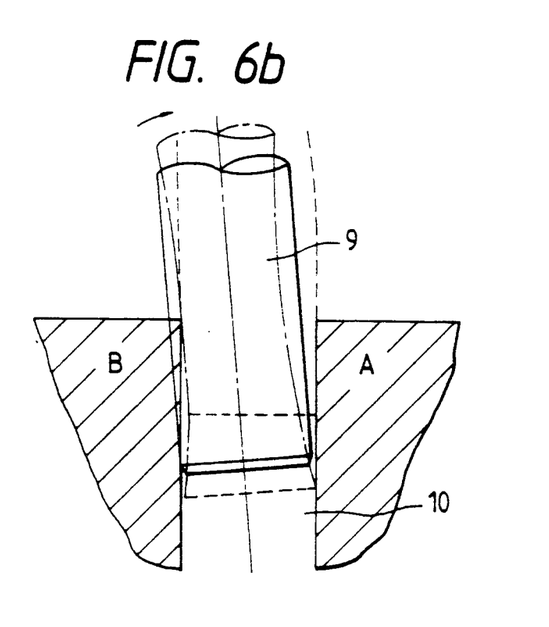
Figure 6C:
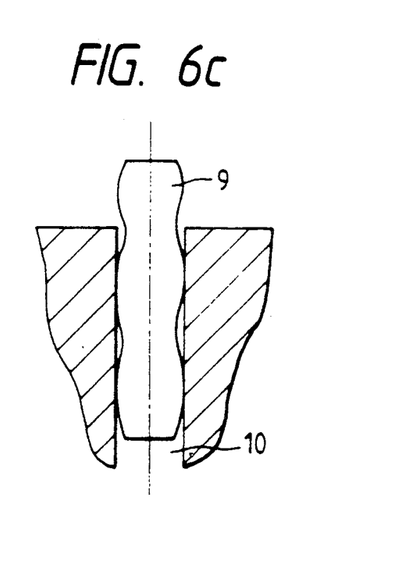

In FIGS. 6a to 6c, a reference numeral 9 depicts a pin and 10 a hole in which the pin 9 is to be fitted. Since the pin 9 vibrates at ultrasonic frequency, it deforms in axial and radial directions alternately as shown by dotted lines in FIG. 6a, in which the pin 9 is shown as being tilted with respect to the hole 10. In FIG. 6a, a top end of the pin 9 contacts with a point A of an inner surface of the hole 10 when the pin 9 is extended axially while being shrinked radially. Due to the axial vibration of the pin 9, friction force at the portion A is substantially reduced.

On the other hand, portion B of an edge of the hole 10 is cleared by the pin 9 when the latter is extended axially while being shrinked radially as shown in FIG. 6a. Thus, top portion of the pin 9 is received in the hole 10.

The inclination of the pin 9 with respect to the hole 10 is corrected by reaction of a contact of a side surface of the pin 9 with the edge of the hole 10 by an axial shrinkage and radial expansion of the pin 9, as shown in FIG. 6b.

Upon a subsequent axial elongation and radial shrinkage of the pin 9, the clearance between the pin 9 and the hole 10 is temporarily enlarged, facilitating the insertion of the pin into the hole.

The above mentioned alternative deformation of the pin 9 is repeated at very high frequency, resulting in a completion of precise fitting of the pin 9 in the hole 10 with relatively small insertion force, as shown in FIG. 6c.

Figures 7A, 7B:
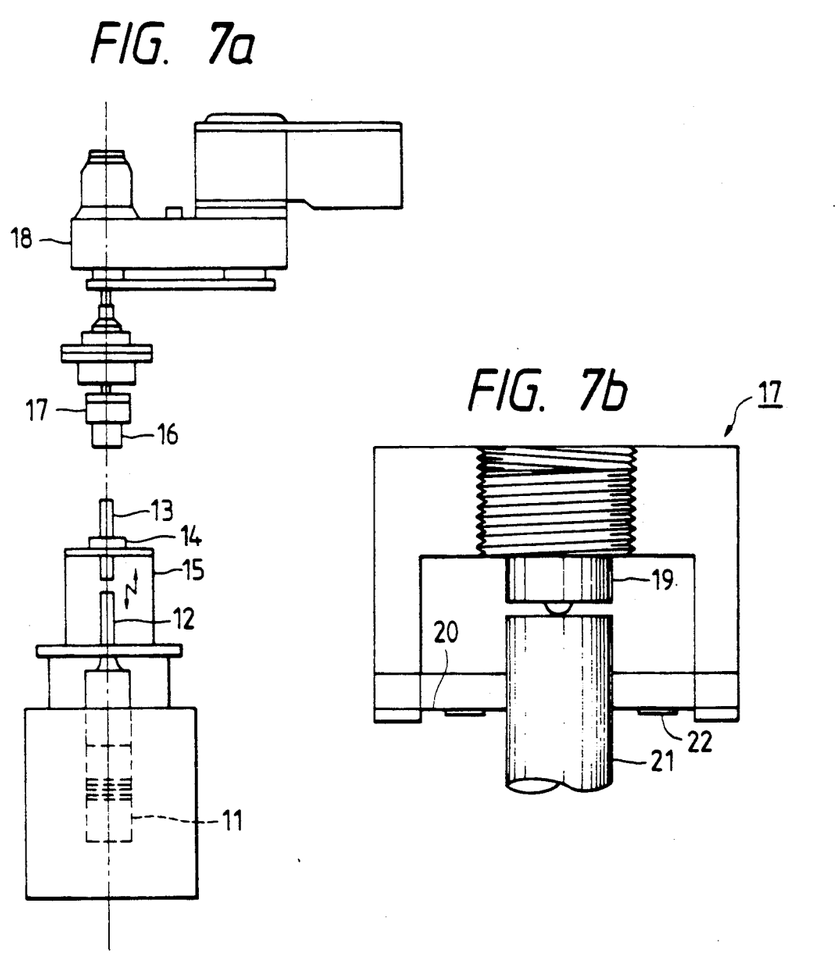
FIG. 7a is a constitution of an experimental apparatus used to confirm the effect of the present invention.
FIG. 7b is a detail of a load sensor portion.

In order to confirm the above mentioned effects caused by the vibration of the pin, insertion force and torsion moment of a pin were detected by mounting the part having a hole through a load sensor mounted on a robot band portion of an apparatus similar to that shown in FIG. 5. FIG. 7a shows a construction of the apparatus used in this experiment. In FIG. 7a, a vibrator 11, a stepped hone 12, a pin 13, a circular ring 14 movable horizontally on a sample support table 15, a part 16 having a hole in which the pin 13 is to be fitted, a robot hand portion 17 and a robot arm 8 are substantially the same as those depicted by reference numerals 1, 2, 3, 4, 6, 7 and 8 in FIG. 5, respectively. A load sensor 17 is provided. FIG. 7b shows a structure of the sensor 17 in detail.

In FIG. 7b, a load cell 19 is provided for measuring of vertical load or insertion force and a cross shaped plate spring 20 is provided for detection of movements around two mutually orthogonal axes which are also orthogonal to a direction of pin insertion. The spring 20 is fixedly secured to an intermedial portion of a support stud 21 which connected to the part 16, and is provided on four arms thereof with strain gauges 22. The load sensor 17 is supported, together with the part 16, by a robot arm 18, with the pin 13 being inserted into the hole of the part by lowering the robot arm 18.

A diameter of the pin 13 was 20 mm and an inner diameter of the hole of the part 16 was selected such that a clearance, i.e., a difference between the outer diameter of the pin and the inner diameter of the hole is 2 $\mu$m.

Figure 8:
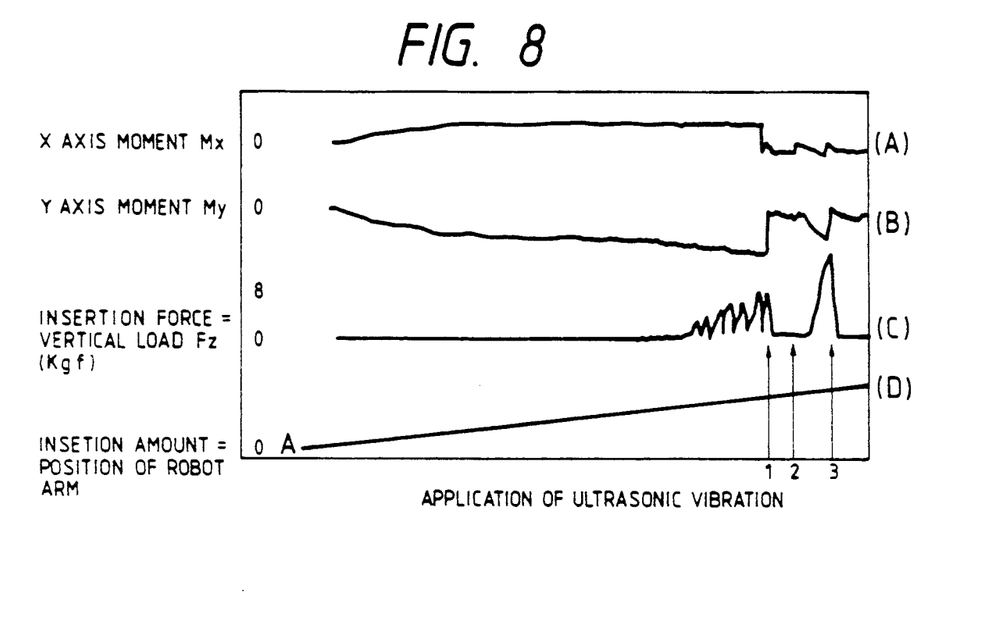
FIG. 8 is a graph showing a result obtained by the experimental apparatus in FIG. 7a when no vibration is applied.
Figure 9:
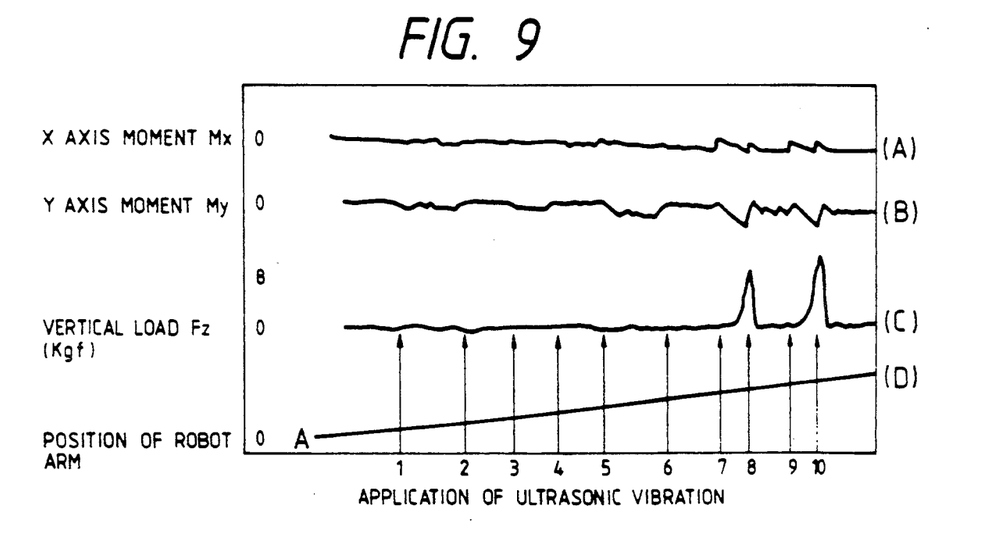
FIG. 9 is a similar graph to that in FIG. 8 when vibration is applied.

Results of the experiment are shown in FIGS. 8 and 9 for insertion without vibration and for that with vibration, respectively. In these figures, waveforms A and B show moments Mx and My around mutually orthogonal axes orthogonal to a direction of insertion, respectively, which are criteria of catching of the pin by the inner wall of the hole, and waveforms C and D show a vertical load insertion force Fz and a position of the robot arm or insertion amount, respectively. In these figures, abscissa shows time.

In FIG. 8, the moments Mx and My start to increase at a start time point A of lowering of the robot arm, showing deviation of force due to eccentricity. Thereafter, step portions appear on Fz, Mx and My, showing stick slip. When the lowering of the robot arm were continued under these condition, the catching of the pin could occur, making the fitting impossible.

A vibration was applied at a time point 1 to the pin, upon which respective waveform returned to their initial values, the catching problem was solved. When the application of vibration was stopped at a time point 2, the catching occurred again. The latter catching was removed by applying vibration at a time point 3.

In FIG. 9, the same insertion was performed with vibration applied to the pin at time point 2, 4, 6, 8 and 10. In this figure, vibration was stopped at time points 1, 3, 5, 7 and 9. After the vibration was removed at 7, catching appeared immediately which was shown by an abrupt increase of Fz. This was removed by application of vibration at 8.

As is clear from the experiment shown in FIG. 8, in a conventional high precision fitting of a pin in a hole with clearance therebetween in the order of several $\mu m$, the insertion becomes impossible due to catching and increased friction. However, by applying vibration to the pin, the problem of catching and increased friction was solved and thus it becomes possible to fit a pin in a hole with minimum insertion force. Further, in FIGS. 8 and 9, it is clear that, by removal of ultrasonic vibration, insertion force and moments are abruptly increased, respectively, which means that frictional force between two members is increased to an extent that fitting cannot be done. This phenomenon can be used to control insertion depth precisely. That is, by measuring insertion depth simultaneously with insertion and by stopping an application of vibration to the pin when measured depth becomes a predetermined value, an insertion operation can be stopped at higher speed than that possible when an operation of robot arm is stopped.

Figure 10:
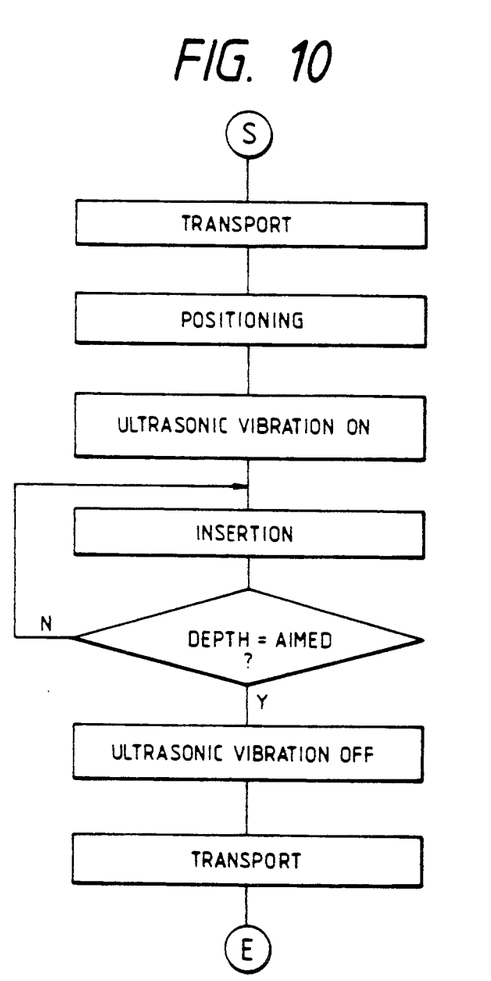
FIG. 10 is a flowchart showing an operation of an ultrasonic vibration apparatus.

The ultrasonic vibration apparatus 41 used in the assembling robot shown in FIG. 5 is energized immediately before a commencement of insertion operation after the pin 3 is aligned with the hole of the part 6 within a positional error tolerance corresponding to a chamfered portion of the pin 3 and deenergized when the insertion depth becomes equal to a desired value. FIG. 10 is a flowchart showing this operation. Since the ultrasonic vibration apparatus is energized in a short period in an insertion stage, heat generation of the vibrator is minimized, resulting in a elongation of life time of the ultrasonic vibration device.

A principle, an operation and an effect of transmission of ultrasonic vibration to the parts to be fitted in the mentioned fitting apparatus will be described.

Generally, a solid member has a specific resonance frequency determined by its physical condition. When vibration is transmitted to such solid member as the pin 3 through a rigid coupling, it is difficult to obtain a resonation or it is necessary to make the coupling special in configuration. Therefore, it is impossible, in such system, to insert a pin 3 having arbitrary configuration into a hole while applying vibration thereto.

Figure 11A:
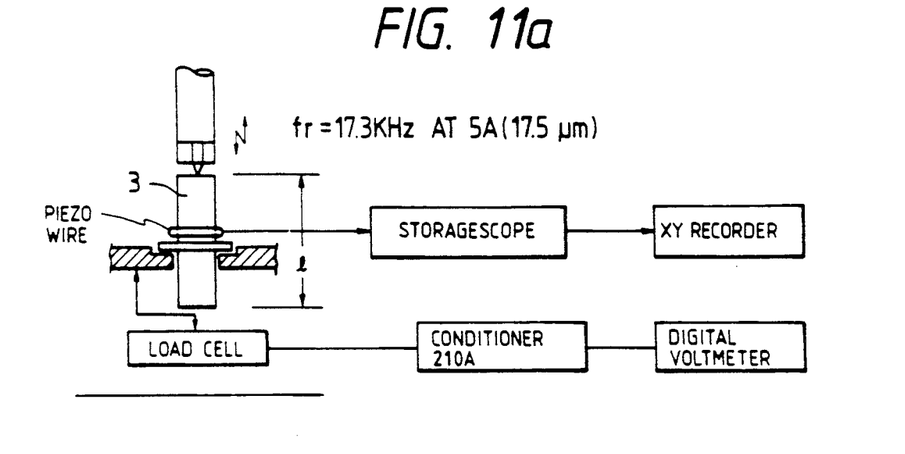
FIG. 11 shows vibration waveforms observed for insertion pins pressurized or shocked by an ultrasonic vibrator.
Figure 11B:
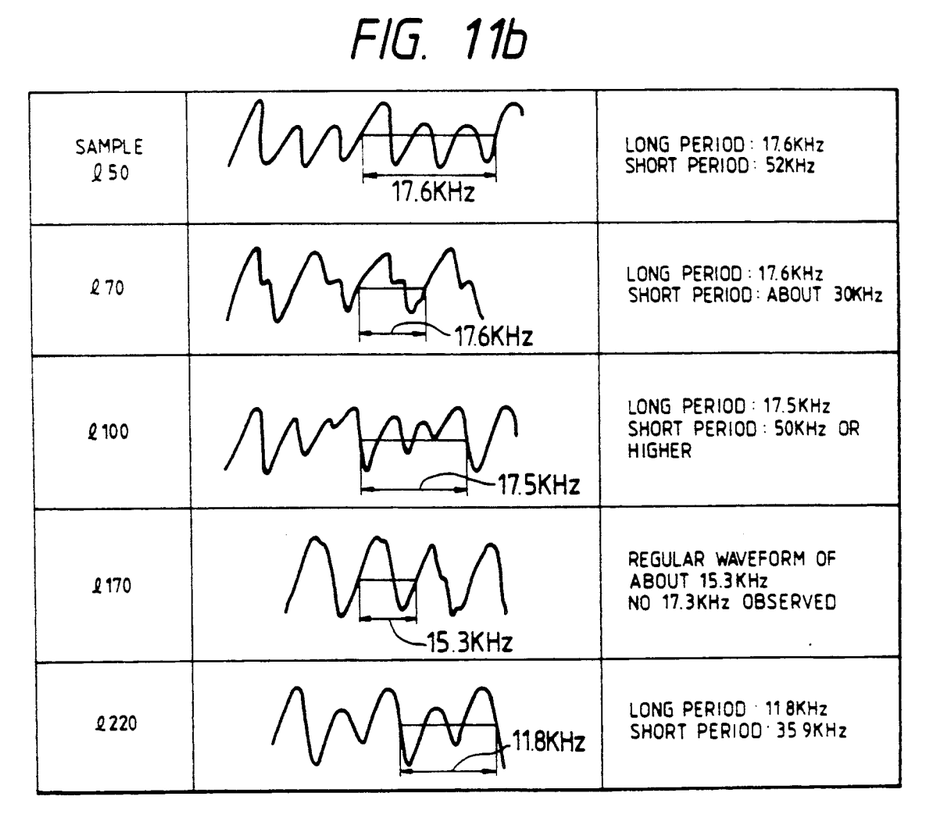

In the above experiment, ultrasonic vibration is coupled to the pin 3 not mechanically but through a ultrasonic vibrator. This is shown in FIG. 11a. The pin 3 to which vibration is transmitted through such ultrasonic vibration is shown in FIG. 11a. Five samples of the pin 3 are prepared whose length l are 50 mm, 70 mm, 100 mm, 170 mm and 220 mm, respectively, and these samples are fitted by a ultrasonic vibrator vibrating at 17.3 kHz. Vibration waveforms of these samples are shown in FIG. 11b. As is clear from FIG. 11b, there is a longitudinal vibration occurred in the pin 3 even when there is no resonance relation between specific frequencies of the ultrasonic vibrator and the pin 3. Therefore, it is enough to transmit such vibration in such a way that its amplitude becomes high enough to produce the effect of reduction of frictional force in a fitting operation.

The assembling fitting by means of the conventional robot is possible with clearance in the order of 10 $\mu m$ while correcting the inclination of the pin with respect to the hole of the part and, for fitting with clearance in the order of several $\mu m$, the application of ultrasonic vibration is effective.

However, when the clearance is small, a fitting becomes very different with the conventional system and, particularly, when the clearance is negative, a fitting must be done by shrink fit or pressure insertion, which requires large load with possibility of damage of fitting surface.

SUMMARY OF THE INVENTION

An object of the present invention is to provide a fitting method applicable to a fitting between two members with minute or negative clearance.

The fitting method according to the present invention is characterized by continuously applying ultrasonic vibration to either or both of the members until a fitting is achieved to a desired depth and thereafter intermittently applying ultrasonic vibration to either or both of the members so that friction therebetween is reduced and inclination of one member to be fitted in the other due to eccentricity of contract reaction force is removed.

DETAILED DESCRIPTION OF THE PREFERRED EMBODIMENT

Figure 1A:
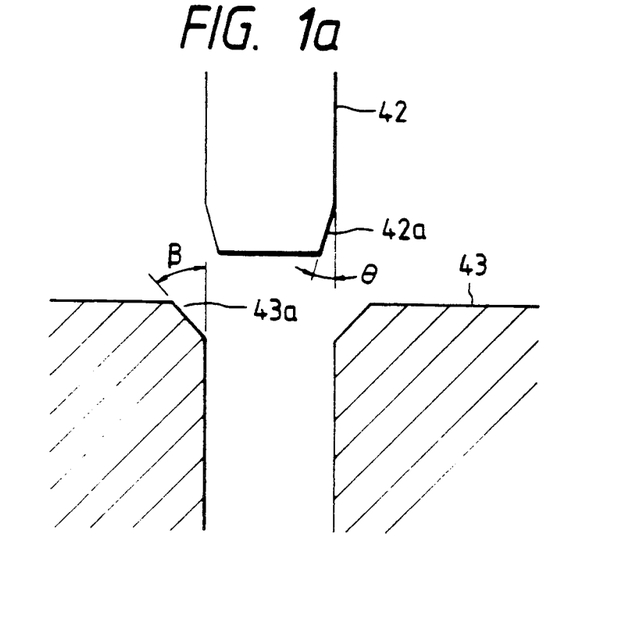
FIG. 1 shows a model for explaining an operation of an embodiment of the present invention.

FIG. 1 shows a model representing an operations of an embodiment of the present invention, in which a reference numeral 42 depicts an insertion pin and 43 a part having a hole in which the insertion pin 42 is to be fitted. A top portion of the pin 42 and an edge portion of the hole of the part 43 are chamfered to form chamfers 42a and 43a, respectively. An angle $\theta$ of the chamfer 42a of the insertion pin 42 and an angle $\beta$ of the chamber 43a of the part 43 satisfy a relation $\theta < \beta$.

The insertion pin 42 is mounted on a cross-head (not shown) and, by lowering the cross head, the pin 42 is positioned with respect to the part 43 by the chamfer 42a of the pin 42 and the chamfer 43a of the part 43 so that the pin 42 is guided smoothly to the hole of the part 43 to start an insertion.

The fitting operation proceeds with a pushing force due to lowering of the pin 42 to which ultrasonic vibration is transmitted through a hone (not shown) through which the same vibration is also transmitted to the part 43. In this case, the pin 42 vibrates at a composite frequency of resonance frequency of the ultrasonic vibration and specific frequency of the pin 42.

An amplitude of vibration of the pin 42 is maximum at a top end portion thereof and, therefore, friction between the top end and a portion of the part which is in contact thereof is substantially reduced to provide a smooth contact plane. Since the pin 42 is subjected to alternative radial expansion and shrink, a clearance between the pin 42 and the part 43 is increased temporarily in fitted condition, facilitating a further fitting with minimum insertion force.

Experiments for confirming the effect of vibration and results thereof will be described with reference to FIGS. 2 to 4.

For the insertion pin 42, grind-finished pins (SK3 heat treated, Hv 520-700) having a common diameter of 20 mm and lengths 50 mm and 65 mm, respectively, were used and, for the part 43, a corresponding part (S45C heat treated, Hv 150-250) was used.

Pins having diameter from 4 to 11 mm were also prepared and tested. Each pin is of SCM415 (Hv 650-800) and grind-finished. Corresponding parts 43 were reamerfinished parts of S45C content-regulated material (Hv 200-300).

The vibration was applied in two ways, one being continuous application and the other being intermittent application. In the latter case, a pressure apparatus is stopped and vibration is applied every time a load reaches a certain value and after the load reduces, vibration is applied again.

Figure 2:
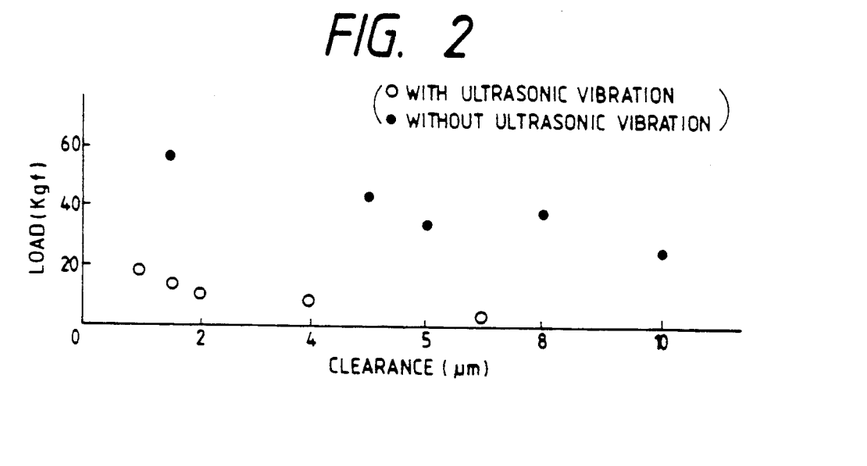
FIG. 2 is a graph showing a relation between ultrasonic vibration and clearance obtained by an experimental device used to confirm the effect of the present invention.

FIG. 2 shows a result of experiment performed with the test sample having diameter of 4 mm. As shown, there is a tendency of increase of insertion load with decrease of clearance regardless of application of ultrasonic vibration. When there is no ultrasonic vibration applied, the load reaches about 60 kgf with clearance of 2 $\mu$m. When ultrasonic is applied, the load is substantially null provided that clearance is several $\mu$m or more. Further the insertion load is not more than 50 kgf even if the clearance is smaller than several $\mu$m, so long as the clearance is positive.

Figure 3:
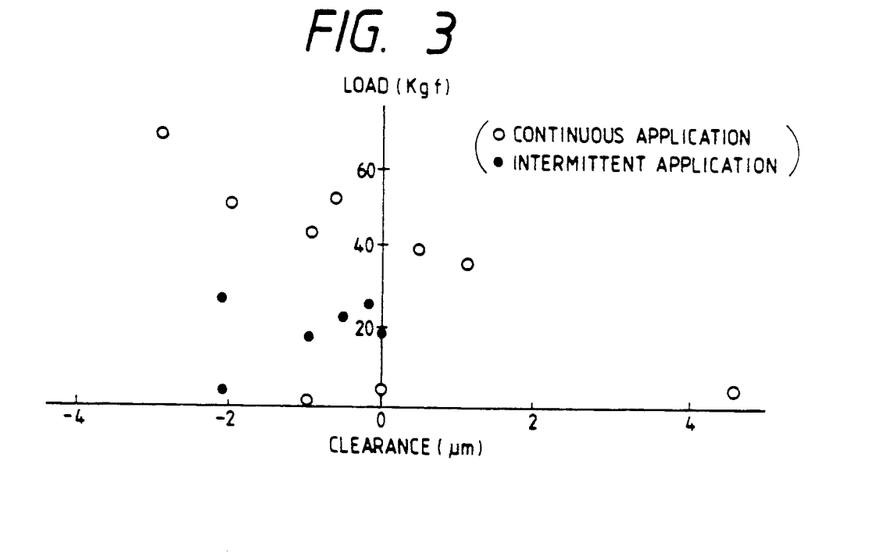
FIG. 3 is a graph showing the relation between vertical load and clearance for cases where ultrasonic vibration is intermittent and continuous, respectively.

FIG. 3 shows a result of experiment performed with the test sample having diameter of 20 mm with negative clearance, in which the effect of intermittent application of ultrasonic vibration, the load increased substantially respective clearances. For the continuous application of ultrasonic vibration, the load increased substantially linearly for clearance from positive several $\mu$m to negative several $\mu$m although there are some exceptions. On the other hand, for the intermittent application, the insertion load is reduced.

Figure 4:
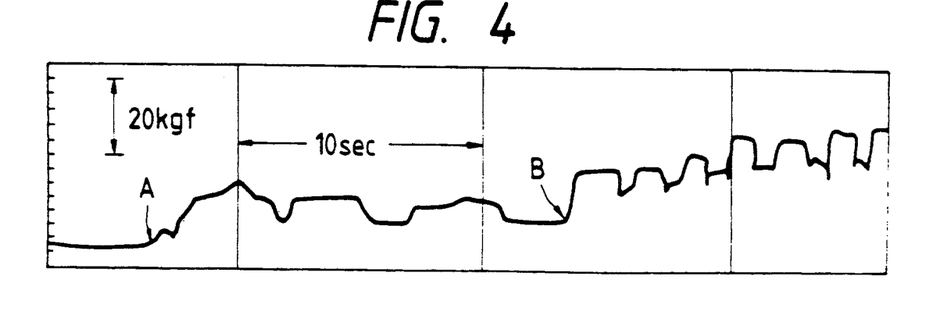
FIG. 4 is a graph showing a load variation with time during insertion.

FIG. 4 shows a load variation with time, during an insertion with clearance of $-2$ $\mu$m. In this case, application of vibration was started at a point A in the initial insertion stage. However, when the load increased abruptly at a point B corresponding to an insertion depth of 2-3 mm, the application of vibration was switched from continuous to intermittent. As a result, the variation of insertion load was limited to 15 to 38 kgf. Thus, undesired increase of variation was prevented.

As mentioned, for clearance of several $\mu$m or more, the insertion pressure becomes substantially null by application of vibration. With the chamfers of the top end of the pin 42 and the edge of the part 43, a fitting is easily realized even if the relative positioning control of them is very rough.

In a case where clearance is 0 m or less (negative), an insertion is influenced by accuracy of measurement of the sample size (circularity, linearity and parallelism) as well as initial altitude thereof with respect to the hole. Therefore, it is difficult to obtain accurate systematic data for the insertion.

Although, the embodiment is described as to the case where the pin 42 is fitted in the part 43 while applying ultrasonic vibration to the pin, it is possible to apply ultrasonic vibration to not the pin but the part 43 or to apply it to both the pin and the part.

Further, it is not always necessary to chamber both the end of the pin and the edge of the hole and, instead, either of the chamfers 42a and 43a may be omitted.

Figure 1B:
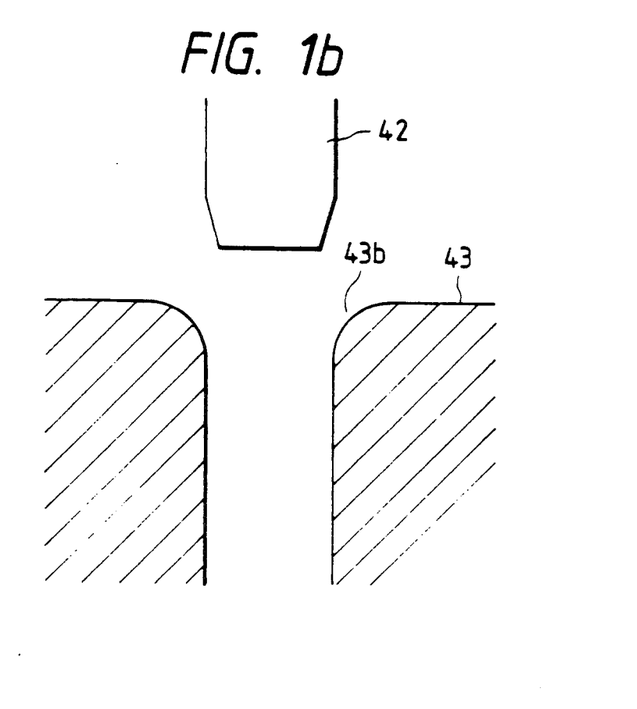

Further, such chamfer or chamfers may be not always flat, and rounded edges such as shown by 43b in FIG. 1b may be used. In the later case, it is preferable that the angle of chamfer of the insertion side member is smaller than that of the chamfer of the receiving side member.

In addition, by providing the function of switching application of ultrasonic vibration from continuous to intermittent upon a detection of an insertion up to a predetermined depth, it is possible to precisely control the insertion depth.

Further, the present invention is applicable to a case where a pin fitted in a hole of a part is to be removed from the latter.

As mentioned hereinbefore, according to the present invention, ultrasonic vibration is applied continuously to either or both of a first member and a second member in which the first member is to be fitted until an insertion depth of the first member in the second member becomes a predetermined value and then intermittently until the insertion completes. Thus, friction between the members is reduced and an inclination of the first member with respect to the second member due to contact reaction is avoided. Therefore, a precision fitting of the members with minute clearance therebetween or with even negative clearance can be realized with minimum insertion force. Further, a removal of the insertion member from the receiving member is also realized without damage of fitting surfaces.

What is claimed is:

1. A fitting method for fitting a first member in a second member comprising the steps of:
    (a) applying ultrasonic vibration to either or both of said first and said second members continuously;
    (b) monitoring an insertion depth of said first member into said second member such that when said first member is inserted into said second member a predetermined depth, said fitting method advances to step (c); and
    (c) applying ultrasonic vibration to either or both of said first member and said second member intermittently for predetermined periods of time substantially shorter in duration than the time required to reach said predetermined depth, such that said application of ultrasonic vibration intermittently allows precise control over an insertion depth of said second member.

2. The fitting method as claimed in claim 1, wherein the clearance between said first and said second members is several μm or less.

3. The fitting method as claimed in claim 2, wherein the clearance is negative.

* * * * *